Feb. 16, 1971  M. DUCKWORTH  3,562,916

RETRIEVABLE BOREHOLE EXTENSOMETER

Filed May 14, 1969  3 Sheets-Sheet 1

INVENTOR
MAYNARD DUCKWORTH

BY Ernest S. Cohen
Gersten Sadowsky
ATTORNEY

Feb. 16, 1971                M. DUCKWORTH                3,562,916
                       RETRIEVABLE BOREHOLE EXTENSOMETER
Filed May 14, 1969                                      3 Sheets-Sheet 2
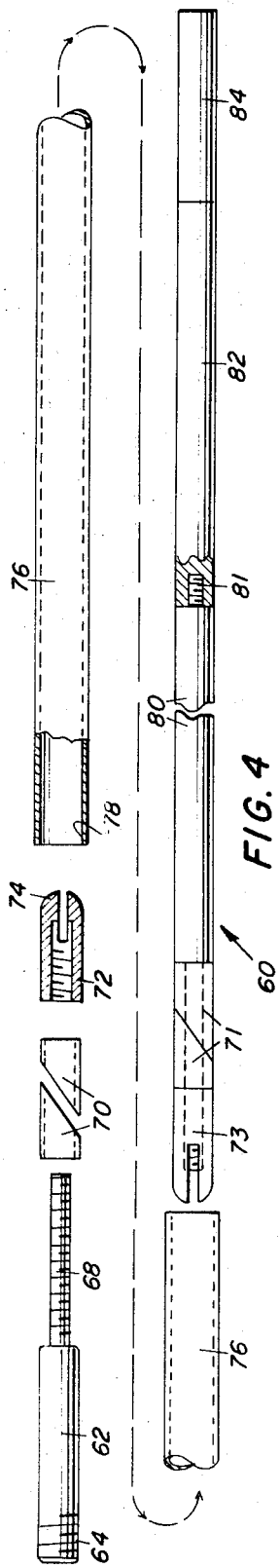
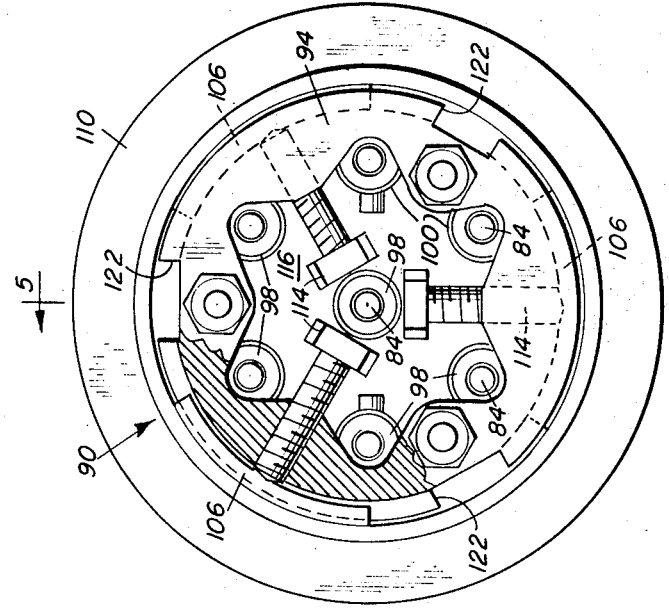
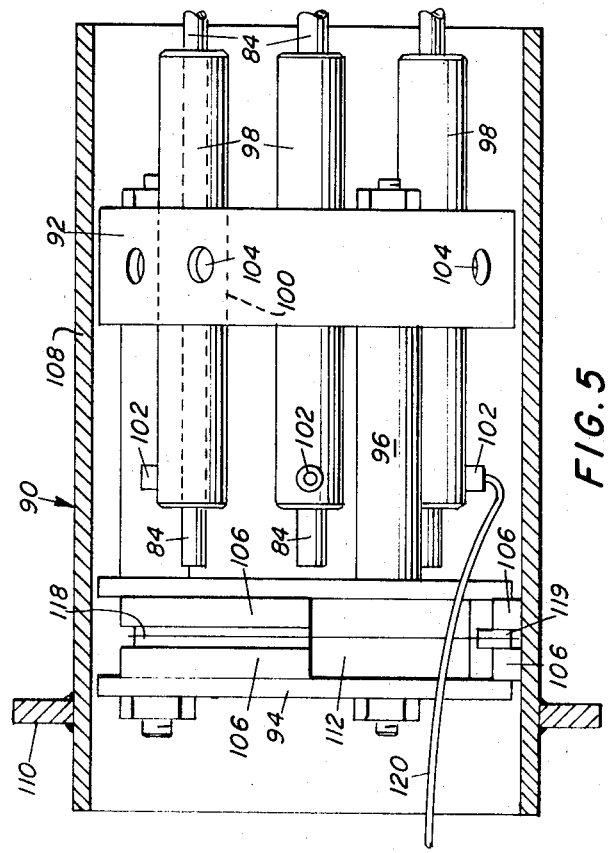
INVENTOR
MAYNARD DUCKWORTH
BY Ernest S. Cohen
   Gersten Sadowsky
              ATTORNEY INVENTOR
MAYNARD DUCKWORTH
BY *Ernest S. Cohen*
ATTORNEY

United States Patent Office 3,562,916
Patented Feb. 16, 1971

3,562,916
RETRIEVABLE BOREHOLE EXTENSOMETER
Maynard Duckworth, Denver, Colo., assignor to the United States of America as represented by the Secretary of the Interior
Filed May 14, 1969, Ser. No. 824,642
Int. Cl. G01n 3/00; E21b 47/00
U.S. Cl. 33—125                        9 Claims

ABSTRACT OF THE DISCLOSURE

Expandable mechanical anchors are linked to a sensor-head for measuring deformation of a formation surrounding a borehole. The anchors are similar in operation to scissor-type jacks, and have radially extending shoes for securing them to the wall of a borehole. The sensor-head is designed for mounting within the collar of a borehole and has a radial array of displacement sensors. When placed for operation, the anchors are mounted serially behind one another within a borehole, with an individual mechanical linkage extending from each anchor and through passages in intermediate anchors, to join with an individual displacement sensor in the sensor-head.

BACKGROUND OF THE INVENTION

This invention concerns displacement measuring apparatus and more specifically a retrievable borehole extensometer for measuring deformation within a rock mass.

Borehole deformation analysis is useful for determining dangerous stress distributions within mine shafts and tunnels, and for determining the most effective foundation constituents for dams and other massive structures. The retrievable borehole extensometer of this invention has wide application to the deformation analysis of many types of geological formations and man-made structures where the deformations of interest take place at locations deep within the structure. Prior borehole extensometers for this purpose lacked the sensitivity and ease of operation which result from the novel combination of features which are incorporated in this multiple position extensometer.

Prior extensometers for measuring deformation at multiple points along a borehole were unacceptable for a variety of reasons. No anchor was available which could be both rigidly and accurately secured to a borehole wall, and at the same time easily retrieved from the borehole after use. Multiple wires under tension were used in prior devices to translate anchor displacement to a sensor-head mounted outside the collar of a borehole. The multiple wires required elaborate calibration and installation. The sensor-head was subject to jarring and disturbance in its position outside the borehole. Each of these factors affected the sensitivity of the instrument and introduced errors into the resulting deformation readings.

Another type of borehole extensometer was only suitable for deformation analysis at two spaced points within a borehole. This type of extensometer employed rigid rods, each rod having one end anchored within a borehole by a fixed anchor, and the other end interacting with a sensor outside the borehole collar. While the rigid connection between the extensometer anchors and sensors provided increased accuracy, the inflexibility of a limited number of measuring points made this type of extensometer impractical for detailed deformation analysis. There was no borehole extensometer available in the prior art combining the consistent accuracy of the fixed anchor and rigid rod with the versatility of the multiple position wire-type extensometers.

SUMMARY OF THE INVENTION

The retrievable borehole extensometer of this invention has a series of independent expandable anchors which monitor deformation at arbitrarily spaced locations within a borehole. The anchors are similar to scissor-type jacks in operation. The anchors are easily secured within a borehole, and are removable after use. Anchoring force is achieved by a positive mechanical interaction of rigid elements rather than by springs, which are neither accurate nor dependable, or permanent grouting, which restricts further use of the borehole.

A rigid metering rod is coupled to each expandable anchor and forms a linkage to a sensor-head mounted within the collar of the borehole. The metering rods from the expandable anchors located within the borehole pass freely to the sensor-head through openings in intermediate anchors. Each metering rod is associated with an individual sensing device within the sensor-head, enabling precise monitoring of the displacement of each individual anchor along the borehole.

Linear variable differential transformer (LVDT) sensors are used in the sensor-head at the borehole collar to detect translation of the anchors and associated metering rods. Each metering rod has an LVDT core attached to its end adjacent the sensor-head. The LVDT core extends into the central bore of an LVDT sensor associated with each metering rod, modifying the electrical output of the sensor as borehole deformation and subsequent movement of the LVDT core in the direction parallel to the borehole take place. LVDT sensors are commercially available which yield measurements with an accuracy of 200 microinches, providing an extremely accurate readout of deformation at points within the borehole. When measurements are completed, the retrievable borehole extensometer can be removed and the borehole used for other purposes.

It is therefore an object of this invention to provide a multiple point borehole extensometer having retrievable anchors.

Another object of this invention is to provide a retrievable anchor which is suitable for measuring deformation at spaced points within a borehole.

Another object of this invention is to provide a retrievable borehole extensometer which employs retrievable anchors and rigid measuring rods for deformation analysis at spaced points within a borehole.

Another object of this invention is to provide a borehole extensometer having a sensor-head which can easily be mounted within the protective confines of a borehole.

Another object of this invention is to provide a rugged borehole extensometer which is sensitive to minute deformations with consistent accuracy.

These and other objects of the invention will become more fully apparent with reference to the following specification and drawing which described the preferred embodiment of the invention.

BRIEF DESCRIPTION OF THE DRAWING

FIG. 4 is a partially sectioned exploded side view of a metering rod assembly shown generally in FIG. 1.

FIG. 15 is a partially sectioned side view of the sensor-head shown generally in FIG. 1.

FIG. 6 is a partially sectioned end view of the sensor-head shown in FIG. 5.

DETAILED DESCRIPTION OF THE INVENTION

Figures 1, 2, 3:
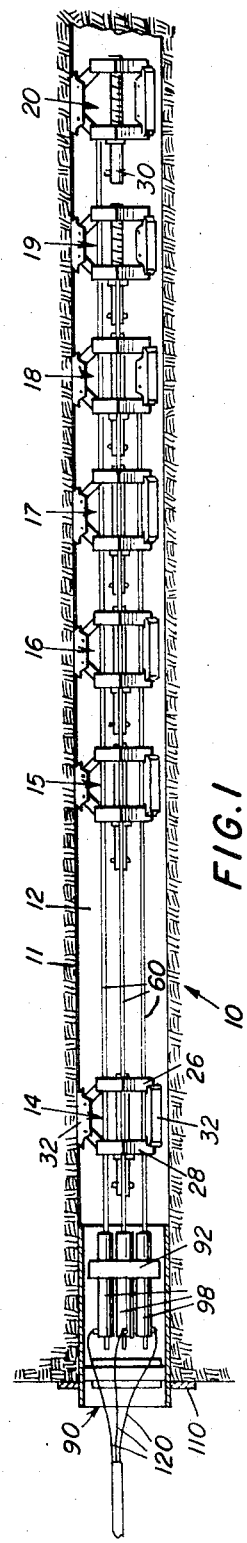
FIG. 1 is a side or plan view of the retrievable borehole extensometer assembled in operating position within a borehole.
FIG. 2 is a partially sectioned side view of an expandable anchor shown generally in FIG. 1.
FIG. 3 is a front end view of the expandable anchor shown in FIG. 2.

A retrievable borehole extensometer 10 is shown in FIG. 1 positioned for measuring longitudinal deformation of a rock mass 11 surrounding a borehole 12. The extensometer includes a sensor-head 90, anchored within the collar of the borehole, and seven expandable anchors 14–20 which are anchored at arbitrarily spaced measuring points within the borehole. An independent rigid metering rod assembly 60 forms a linkage from each anchor 14–20 to a corresponding electro-mechanical sensor 98 in the sensor-head 90.

Longitudinal deformation of the rock mass 11 adjacent an anchor 14–20 translates the anchor along the borehole axis relative to the sensor-head. This translation of the anchor is transmitted by a rigid metering rod assembly 60 to an electro-mechanical sensor 98 in the sensor-head 90. An individual sensor 98 is associated with each anchor 14–20 and attached metering rod assembly 60, enabling a simultaneous determination of the relative movement of the rock mass 11 at spaced measuring points along the entire length of the borehole 12. The relative longitudinal displacement of an anchor and sensor-head modify an electrical output signal from the electro-mechanical sensor 98, providing an easily interpreted indication of deformation. Transverse deformation or shear of the borehole wall has no direct effect upon this indication.

An expandable borehole anchor 15 is shown in FIGS. 2 and 3. The anchor 15 resembles a scissor-jack in operation. As a central thrust shaft 30 on the anchor 15 is rotated, a pair of parallel hexagonal plates 26 and 28 are drawn together. As the spacing between the plates 26 and 28 decreases, three thrust shoes 32 are driven radially outward, expanding the effective diameter of the anchor 15.

The thrust shaft 30 of the expandable anchor 15 is a hollow cylinder which has external screw threads at one end, and a pair of laterally extending thrust lugs 40 secured near the other end. The thrust lugs 40 are anchored to the side wall of the thrust shaft, leaving the axial bore of the shaft open. The lugs 40 act as levers for rotation of the thrust shaft 30 when fastening or removing the expandable anchor 15 within a borehole. A narrow restraining collar 44, fixed on the central body of the thrust shaft 30, acts as a stop for restricting the travel of hexagonal plate 28 along the shaft.

The hexagonal plate 26 on the threaded end of the thrust shaft 30 has a threaded central bore and is threaded to the shaft. Relative rotation of the thrust shaft 30 and plate 26 causes the plate to translate along the shaft. The other hexagonal plate 28 on the central body of the shaft 30 has a smooth central bore, and freely rotates and translates on the shaft between collar 44 and the threaded hexagonal plate 26.

On each hexagonal plate 26 and 28 there are three equilaterally spaced radial slots 38 which extend radially inward from alternate peripheral facets on the plates. The parallel hexagonal plates 26 and 28 are symmetrically aligned on the thrust shaft 30, so that the corresponding slots 38 in each plate are radially aligned when viewed from an end of the shaft. One end of a pivot link 34 rotates in each slot 38 about a pivot pin 36, which extends transversely through the side walls of the slot. The other end of each pivot link 34 rotates about a second pivot pin 36, within a longitudinal slot 31 in a thrust shoe 32, three of which bridge the hexagonal plates 26 and 28 between radial slots 38. When the hexagonal plates 26 and 28 are drawn together by rotating thrust shaft 30, the thrust shoes 32 are driven radially outward, increasing the effective diameter of the anchor 15. A lip 33 at opposite ends of each thrust shoe 32 cooperates with an adjacent hexagonal facet to prevent longitudinal alignment of the pivot links 34 at each end of the thrust shoe, preventing inward displacement of the thrust shoes.

For convenience in mounting the expandable anchor 15 within a borehole, setting springs 46 extend between alternate facets of hexagonal plates 26 and 28, between thrust shoes 32, to draw the plates together and bias the thrust shoes radially outward. When the expandable anchor 15 is inserted into a borehole, the radial thrust induced by springs 46 is sufficient to restrain the hexagonal plates from rotation with the thrust shaft 30 until the thrust shoes 32 are secured against the borehole wall.

As shown in FIG. 1, when retrievable extensometer 10 is assembled within a borehole 12, seven expandable anchors 14–20 are secured in alignment behind one another to the borehole wall with a metering rod assembly 60 extending from each anchor, through intermediate anchors, to a sensor-head at the collar of the borehole. In FIG. 3 an end view of one expandable anchor 15 is shown as it would be viewed down the borehole, with hexagonal plate 28 nearest the collar of the borehole. A concentric array of holes 48 and 50 extend through the hexagonal plate 28, with a threaded mounting hole 48 located adjacent one vertex, and five larger smooth bored holes 50 located adjacent each of the other vertices. The threaded mounting hole 48 is used for attaching a rigid metering rod assembly 60, as shown in FIGS. 1 and 4, to the expandable anchor 15. The smooth bored holes 50 form passages for the metering rod assemblies which extend from the anchors 16–20, positioned deeper within the borehole, through individual sectors of borehole space, to the sensor-head 90. The holes 50 in hexagonal plate 28 are aligned with similar holes in the other hexagonal plate 26 to provide continuous passages for the metering rod assemblies.

Since each metering rod assembly 60 passes through an independent sector of borehole space, the mouting hole 48 in each anchor must also be positioned in an independent borehole sector. This could be accomplished by uniformly rotating each anchor one sixth of a revolution with respect to the previous anchor within the borehole. However, this is not desirable since a rotation of one sixth revolution results in misalignment of the thrust shoes of alternate anchors. Greatest uniformity of measurement is achieved when the thrust shoes of all the anchors 14–20 are aligned in similar radial planes. To preserve this alignment, alternate positions for mounting hole 48 are provided on each pair of anchors.

In three of the expandable anchors 15, 17 and 19, the mounting hole 48 is positioned as shown in FIG. 3 for anchor 15. In another three anchors 16, 18, and 20, the mounting hole 48 is interchanged with the smooth bored hole 50 which is adjacent the original mounting hole position of anchor 15, and which is between a similarly positioned pair of thrust shoes 32. A similar change is made in the corresponding hole 50 in hexagonal plate 26. The anchors 15, 17, and 19, with the one mounting hole configuration, alternate within the borehole with the anchors 16, 18, and 20, having the interchanged configuration. As a result the positions of mounting holes 48 can be varied through all the borehole sectors by rotating each pair of anchors one third revolution with respect to an adjacent pair. Since the anchors are equilaterally symmetrical, alignment of the thrust shoes is maintained.

The seventh anchor 14, which is located nearest the sensor-head, as shown in FIG. 1, has six smooth bored holes 50 extending through each hexagonal plate 26 and 28 adjacent the hexagonal vertices. In the seventh anchor 14 a smooth bored hole 50 is substituted for the mounting hole 48 of anchor 15. The radial array of six smooth bored holes 50 on the anchor 14 provides passages for each of the six metering rod assemblies of the six anchors 15–20 positioned deeper within the borehole. A partial metering rod assembly 60 is coupled to the seventh anchor 14 by inserting a metering rod 76, without an anchor coupling 62, within the hollow bore of the thrust shaft 30 of the anchor. The metering rod is secured by set screws (not shown) inserted through holes 52 in the collar 44 on the shaft.

The metering rods 60, which are used as linkages for transmitting the movement of each anchor to the sensing head, may be any suitable rigid shaft. A particularly convenient lightweight metering rod assembly 60 is shown in FIG. 4. At the anchor-end of the metering rod assembly there is an anchor coupling 62 with a threaded shaft 64 for fastening the coupling within a threaded bore 48 on an expandable anchor 14–20. At the other end of the anchor coupling 62 a narrower threaded shaft 68 receives a pair of opposed tubular coupling wedges 70 and a split friction nut 72. The friction nut 72 is split at a rounded end opposite the coupling wedges and the resulting prongs 74 are spread slightly outward from the body of the nut. The anchor coupling 62, with the coupling wedges 70 and split friction nut 72 secured to the threaded shaft 68, is inserted into the end of a thin walled tubing metering rod 76 until the hexagonal plate 28 abuts the end of the rod. The split end 74 of the friction nut 72 engages the inner wall 78 of the metering rod 76 with a tight slip fit. Relative rotation of the anchor coupling 62 and metering rod 76 drives the friction nut 72 against the opposed coupling wedges 70, which are restrained by the body of the anchor coupling 62. As the coupling wedges 70 are forced together they are laterally displaced in opposite directions against the inner wall 78 of the metering rod 76, forming a firm attachment to the rod.

The metering rod assembly 60 extends from an expandable anchor 14–20 within the borehole to the sensor-head 90. Where long boreholes are examined it is convenient to divide the metering rod 76 into easily manageable sections. A metering rod coupling (not shown), with opposite ends having fasteners similar to the rod end of the anchor coupling, is used to join the metering rod sections into an effectively continuous metering rod.

A core anchor extension rod 80 is joined to the sensor-head end of the metering rod 76 by wedges 71 and a nut 73 on a threaded end of the extension rod. A linear variable differential transformer (LVDT) core 82 is attached to the other end of the extension rod 80 by a threaded projection 81 on the rod and a threaded bore in the end of the core 82, as shown in partial section in FIG. 4. A core extension 84, with a similar threaded projection (not shown) is joined to the other end of the core 82, completing the metering rod assembly 60.

The LVDT core 82 near the end of the metering rod assembly 60 is the movable member of an electro-mechanical LVDT sensor 98 in the sensor-head 90. The LVDT sensor 98 transduces the mechanical displacement of each expandable borehole anchor into an electrical readout signal.

Figure 7:
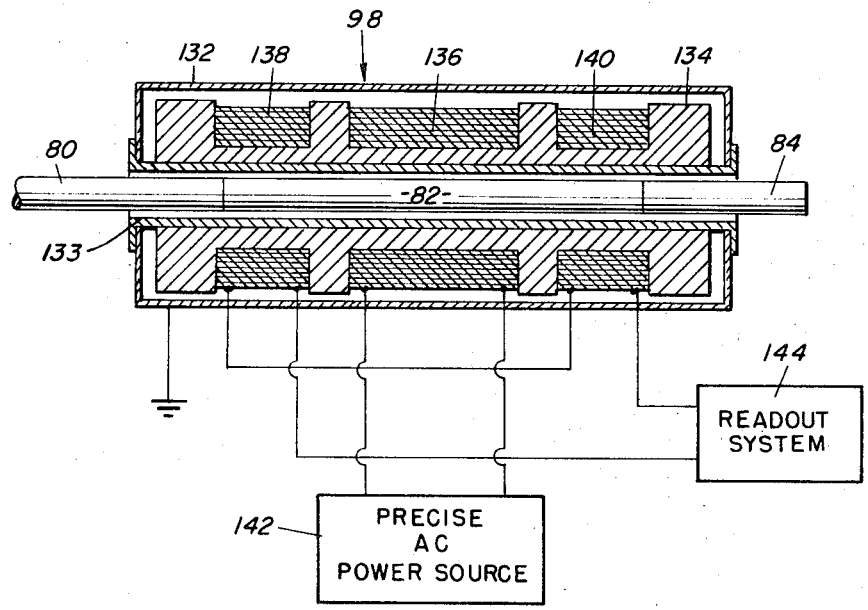
FIG. 7 is a sectional side view of a linear variable differential transformer shown generally in FIGS. 5 and 6.

The sensor-head 90, which is shown in detail in FIGS. 5 and 6, includes spaced concentric mounting and anchor discs 92 and 94 which are coupled to the opposite threaded ends of three symmetrically spaced connecting rods 96. Seven LVDT sensors 98 are inserted through smooth bores 100 in the mounting disc 92, as shown in partial section in FIG. 5, and also in FIG. 6, with the electrical terminals 102 of the LVDT sensors 98 positioned in the open space between the opposite faces of the mounting and anchor discs 92 and 94. The smooth bores 100 in the mounting disc 92 are positioned on centers which duplicate the spacing of the holes 48 and 50 in each expandable anchor so that the seven LVDT sensors mounted on the disc 92 can be aligned with the metering rod assemblies from the seven anchors when assembled within a borehole. The LVDT sensors 98 are rigidly secured within the mounting holes 100 on the disc 92 by radial set screws in radial bores 104. In operating position, an LVDT core 82 and core extension 84 extend into and through a central bore in each LVDT sensor coil 98, as is best seen in FIG. 7. The LVDT sensor core 82 and core extension 84 translate freely through the coil of the sensor. The extension 84, by effectively continuing the core beyond the end of the LVDT sensor, prevents the end of the core from sagging on the metallic LVDT shielding 132 when displacement of the core occurs.

The anchor disc 94 is used to secure the sensor-head 90 within a tubular borehole sleeve 108. The sleeve 108 is aligned and permanently grouted at the collar of a borehole, with a flange 110 near an end of the sleeve 108 abutting the face of the borehole. Three radial thrust shoes 106 nest within an annular slot 112 on the peripheral side wall of the disc 94. The thrust shoes 106 are driven against the inner wall of the collar 108 by thrust screws 114 which extend radially outward through the anchor disc 94 from an irregular central aperture 116. A conical depression in the mid-section of each thrust shoe prevents circumferential sliding of the shoes. A wire snap ring 118, simultaneously nested within annular grooves 119 on the outer surfaces of each thrust shoe 106, retains the shoes on the disc 94 within the annular slot 112.

The irregular central aperture 116 in the anchor disc 94 has an opening above each LVDT sensor for free passage of the associated core extension through the disc 94 as borehole deformation takes place. Additional open areas in the aperture 116 are provided for turning thrust screws 114 for attachment and removal of the sensor head from the sleeve 108. While it is possible to pass the electrical readout leads 120 from each LVDT sensor 98 through the aperture 116, the free movement of core extensions 84 and thrust screws 114 within the aperture make this impractical. As an alternative, longitudinal slots 122 are cut between each thrust shoe 106 on the peripheral edge of anchor disc 94, and the readout leads 120 are strung through the slots. In FIGS. 5 and 6 a readout lead 120 is shown for only one sensor for the sake of clarity. A similar readout lead 120 extends from each sensor terminal 102 through a nearby longitudinal slot 122.

The electrical connections common to each LVDT sensor 98 in sensor-head 90 are shown in FIG. 7. The LVDT sensor 98 includes a grounded metallic casing 132 with an aperture at each end. A movable soft iron core 82, between a core anchor extension rod 80 and a core extension 84, extends through the casing aperture within a tubular liner 133. Within the metallic shielding there is a smooth bored insulating form 134 around which three inductance coils 136–140 are wound. A primary coil 136 is wound on the central portion of the insulating form, and secondary coils 138 and 140 are wound at each end of the primary coil. A controlled alternating voltage is induced in the central primary coil 136 by a precise A.C. power source 142, generating a flux that is carried by the core 82 to the secondary coils 138 and 140 on each side of center. When the movable core 82 is off center, more voltage is induced by the flux in one secondary coil than is induced in the other. The two secondary coils 138 and 140 are connected in series opposition, and the difference in potential between them is read on a highly sensitive voltmeter in a readout system 144. As the core 82 is moved by rock deformation, the voltage change increases in the direction of, and is proportional to, the rock movement.

The process of assembling the elements of the borehole extensometer 10 within the borehole 12, as shown in FIG. 1, will now be described in detail. A borehole sleeve 108, as shown in FIG. 5 is grouted in alignment with the collar of the borehole. An anchor coupling 62, with coupling wedges 70 and a split friction nut 72, as shown in FIG. 4, is fastened at a mounting hole 48 to the hexogonal plate 28 of expandable anchor 20. A length of metering rod 76, a core anchor extension rod 80, an LVDT core 82, and a core extension 84 are then joined to the anchor coupling to form a metering rod assembly 60. The length of the complete metering rod assembly 60 is chosen to extend from a selected anchoring point for anchor 20, near the bottom of the borehole, to just short of the borehole face within the sleeve 108. A slotted socket 152 of a placing rod 150, as shown in FIG. 8, is then slipped over the end of the thrust shaft 30 on the expandable anchor 20, with the thrust lugs 40 nested within the longitudinal slot of the socket.

Figure 8:
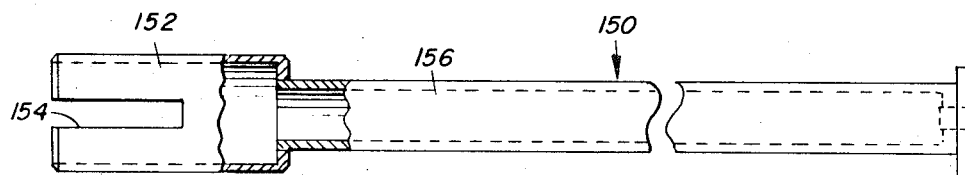
FIG. 8 is a side view of a placing rod for securing the anchor of FIGS. 2 and 3 within a borehole.

The placing rod 150, as shown in FIG. 8, is a hollow tubular shaft 156 having a slotted socket 152 mounted at one end and a crank handle 158 mounted at the other end. The placing rod 150 is used to position each expandable anchor 14–20 within the borehole 12, and is long enough to reach the deepest required anchor position. For convenience the placing rod may be divided into segments and joined to working length by suitable couplings.

With the slotted socket 152 engaging the thrust shaft 30 of the first expandable anchor 20, the anchor, metering rod assembly 60, and placing rod 150 are inserted into the borehole with the threaded end of the thrust shaft 30 closest to the borehole bottom. At the desired anchor point within the borehole, the placing rod is rotated by crank handle 158, rotating thrust shaft 30 relative to hexagonal plates 26 and 28. Tension springs 46 bias the thrust shoes 32 on the anchor against the borehole wall, preventing the hexagonal plates 26 and 28 from rotating with the thrust shaft 30. The thrust shaft 30 draws the hexagonal plates 26 and 28 together, driving thrust shoes 32 solidly against the borehole wall. When the anchor 20, with the attached metering rod, is firmly secured the placing rod is withdrawn.

A metering rod assembly 60 is then attached to the second expandable anchor 19 at the mounting hole 48. The mounting hole 48 of the second anchor 19 is displaced from the position of the mounting hole on the first anchor 20 as previously explained. The placing rod is joined to the anchor 19, and the anchor, metering rod assembly, and placing rod are inserted into the borehole with the thrust shoes of the second anchor aligned with those of the first anchor.

In this position of anchor 19, the first metering rod assembly 60 of anchor 20 passes through the smooth bore 50 adjacent the threaded mounting hole 48 of anchor 19. The anchor 19 is guided into the borehole to an arbitrary point, spaced from the first anchor 20, and secured to the borehole wall. Again the metering rod assembly from the second anchor extends to a point just short of the mouth of the borehole within the sleeve 108. In a similar manner four more expandable anchors 15–18 and attached metering rod assemblies 60, are inserted into and anchored at arbitrary spaced depths within the borehole. The metering rod assembly 60 of each anchor extends freely through the smooth bores 50 of all subsequently inserted anchors.

The seventh and final anchor 16 inserted into the borehole has smooth bores 50 extending through the hexagonal plates 26 and 28 adjacent each hexagonal vertex. A metering rod 76 is secured within the thrust shaft of the seventh anchor by radial set screws 52 in the collar 44 on the shaft. The six metering rod assemblies 60 of the six previous anchors 15–20 are inserted through the smooth bores 50 of the seventh anchor 16 as it is placed within the borehole. The seventh metering rod assembly 60 nests within the hollow tubular shaft 156 of placing tool 150 as the anchor 16 is positioned and secured.

When the last anchor and metering rod are positioned within the borehole, the ends of seven independent metering rod assemblies extend a similar distance within the borehole sleeve 108. The longitudinal position of each rod is restricted by the anchor to which it is attached within the borehole, while the lateral position of each rod is established by the uniform spacing of the holes 48 and 50 in each anchor.

The sensor-head 90 is inserted into the borehole sleeve 108 with an individual core extension 84 and LVDT core 82, at the end of each metering rod assembly 60, positioned within an individual LVDT sensor 98. The sensor-head is seated in rigid concentric alignment with the sleeve 108 and borehole 12 by thrust shoes 106, which are driven radially outward to the inner wall of the sleeve 108 by thrust screws 114.

The readout cables from the seven LVDT sensors, as shown in FIG. 7, are connected to a readout system 144, which includes a sensitive voltmeter. Where simultaneous readout from each sensor is required, multiple meters are provided. Where serial readout is acceptable, a single meter with appropriate switching is used.

Any relative movement between an anchor 14–20 and the sensor-head 90 is transmitted directly by a metering rod assembly 60 to the core 82 of an LVDT sensor 98. Each core is free to move longitudinally within the sensor-head 90, to which the LVDT sensors are rigidly fastened. As an LVDT core is displaced relative to the transformer coils in an LVDT sensor 98, the output voltage of the LVDT sensor changes. This change in voltage represents actual linear displacement of the rock mass surrounding the borehole 12. An arbitrary anchor, or the sensor-head 90, is taken as a stable reference point, and borehole deformations are referenced to that point. Since relative displacements are measured, the original position of the LVDT core 82 within the LVDT sensor 98 is not critical. Movement in either direction is measured as a variation from an initially determined reference voltage of each LVDT sensor.

In adapting the preferred embodiment of this invention to a particular measuring environment, numerous modifications within the scope of the invention will become apparent to those skilled in the art.

The expandable anchors of the invention are equally suited to operation with mechanical readout devices, in addition to the preferred electrical readout devices described. A simplified mechanical readout could be obtained, for example, by measuring the relative displacement of the LVDT core 82 and the LVDT sensor 98 in the disclosed embodiment.

The openings in each expandable anchor for passage of the metering rods could be slots in the sides of parallel plates of any shape, rather than holes 50 as shown. The hexagonal plates could alternately be shaped as discs, each disc having three radial spokes for attachment of thrust shoes. A metering rod could be secured to an outside edge of each disc between a pair of spokes, with the metering rods from other anchors extending through the spaces between the spokes. Numerous alternatives for attachment of the metering rods to individual anchors will be equally apparent for adapting this invention to a particular borehole deformation environment.

Although each thrust shaft 30 is described as a hollow tubular shaft, a solid rod is equally suitable. A hollow shaft is desirable for attachment of a metering rod within the shaft, and for passage of a centrally positioned metering rod through intermediate anchors. Where a metering rod is coupled to the end of the thrust shaft, by a suitable threaded fastener, for example, a solid rod is sufficient. Similarly, mounting holes 48 may be eliminated if an alternative coupling is provided for the metering rod on each anchor.

For convenience in assembling the borehole extensometer 10 is is desirable that each another have the same number of smooth bored holes 50, making pairs of anchors interchangeable. However, the anchors could be constructed with the number of smooth bored holes 50 in each anchor limited to the number required for passage of the metering rods from anchors deeper within the borehole. As an example, using this alternative construction, the expandable anchor nearest the bottom of the borehole would require only a mounting hole 48.

Other modifications will become apparent to those skilled in the art in the light of the above teachings and within the scope of the appended claims.

What is claimed is:

1. An expandable borehole anchor comprising:
   a pair of spaced parallel plates, each of which is substantially symmetrical about an aperture extending through its center, a threaded shaft extending through the aperture of each plate, means cooperating with the threaded shaft for changing the spacing between the parallel plates as the threaded shaft is rotated, means pivotably bridging from an edge of one parallel plate to a corresponding edge of the other plate for radial movement relative to the shaft and parallel plates as the spacing between the parallel plates changes upon rotation of the shaft, the spaced pair of parallel plates further including an array of spaced openings through each plate, the openings located inward from the pivotably bridging means on pairs of common axes extending through both plates in a direction parallel to the threaded shaft, for providing an array of continuous passages to enable unrestricted axial movement of an array of rod-like mechanical linkages past the plates, a rigid, rod-like, mechanical linkage, and means securing the mechanical linkage to one of the spaced parallel plates with the linkage extending in a direction parallel to the common axes for movement of the linkage as a rigid unit together with the parallel plates and shaft.

2. An expandable borehole anchor as claimed in claim 1 in which:

the means for changing the spacing between the parallel plates includes screw threads in the central aperture of at least one plate.

3. An expandable borehole anchor as claimed in claim 1 in which:

the means for changing the spacing between the parallel plates includes screw threads in the central aperture of one plate, and a smooth bored central aperture in the other plate for free rotation and translation of the other plate on the threaded shaft between the threaded plate at one end, and a rigid stop at the other end.

4. An expandable borehole anchor as claimed in claim 2 in which:

the spaced openings are symmetrically located relative to a longitudinal axis of the threaded shaft.

5. An expandable borehole anchor as claimed in claim 3 in which:

the spaced openings are symmetrically located relative to a longitudinal axis of the threaded shaft.

6. A borehole extensometer comprising:

a plurality of axially aligned radially expandable anchors, the plurality of expandable anchors having a number of pairs of axially aligned openings extending through them, the number of pairs of openings in a given anchor being at least equal to the number of anchors aligned with the given anchor on the side of the anchor farthest from the sensor head, a sensor-head, having a plurality of sensors, aligned with the radially expandable anchors, a plurality of substantially rigid mechanical linkages interconnecting each of the plurality of expandable anchors, through the openings is all intermediate anchors, to an individual one of the plurality of sensors for measuring relative displacement between the sensor-head and each of the plurality of expandable anchors, readout means associated with each of the plurality of sensors for indicating the relative displacement between the sensor-head and each of the plurality of radially expandable anchors;

each of the plurality of radially expandable anchors further comprising:

a pair of spaced parallel plates, each of which is substantially symmetrical about an aperture extending through its center, a threaded shaft extending through the aperture of each plate, means for changing the spacing between the parallel plates as the threaded shaft is rotated, means pivotably bridging from an edge of one parallel plate to a corresponding edge of the other plate for radial movement relative to the shaft and parallel plates as the spacing between the parallel plates changes upon rotation of the shaft, and means for securing one of the plurality of mechanical linkages to one of the spaced parallel plates for movement of the linkage together with the parallel plates and shaft;

each intermediate anchor of the plurality of anchors having at least one of said openings through each parallel plate, located inward from the pivotably bridging means on a common axis which extends through both plates in a direction parallel to the threaded shaft, for providing a continuous passage past the plates, whereby, when the plurality of radially expandable anchors is aligned within a borehole, each of the plurality of mechanical linkages, which interconnects one of the plurality of radially expandable anchors to an individual one of the plurality of sensors, extends through said openings in each intermediate radially expandable anchor.

7. A borehole extensometer as claimed in claim 6 in which each intermediate anchor of the plurality of radially expandable anchors further includes:

an array of regularly spaced openings through each parallel plate, the openings located inward from the pivotably bridging means on pairs of common axes which extend through both plates in a direction parallel to the threaded shaft, for providing an array of continuous passages past the plates, the regularly spaced openings being symmetrically located with respect to the longitudinal axis of the threaded shaft of each intermediate expandable anchor, and the plurality of sensors are symmetrically located with respect to a longitudinal axis of the sensor-head in an array substantially duplicating and aligned with the regularly spaced openings of each intermediate expandable anchor.

8. A borehole extensometer as claimed in claim 7 in which:

each of the plurality of sensors includes a linear variable differential transformer.

9. A borehole extensometer as claimed in claim 7 in which:

the sensor-head is suitably dimensioned for substantially complete insertion within a borehole.

References Cited

UNITED STATES PATENTS

| | | | |
|---|---|---|---|
| 170,467 | 11/1875 | Boomer | 73—88 |
| 1,406,350 | 2/1922 | Corrigan | 166—206X |
| 3,380,167 | 4/1968 | Abel et al. | 33—125 |
| 3,327,396 | 6/1967 | Waddell | 33—125 |
| 948,532 | 2/1910 | Stocking | 52—161 |
| 1,807,488 | 5/1963 | Michalicek | 52—161 |

JAMES J. GILL, Primary Examiner

M. SMOLLAR, Assistant Examiner

U.S. Cl. X.R.

73—88, 151; 166—134